United States Patent [19]
Hagerman

[11] Patent Number: 5,471,255
[45] Date of Patent: Nov. 28, 1995

[54] BIAS DRIVE AND NOISE REDUCTION IN IMAGE PROJECTORS

[76] Inventor: James G. Hagerman, 5137 Camino Playa Malaga, San Diego, Calif. 92124

[21] Appl. No.: 980,681

[22] Filed: Nov. 24, 1992

[51] Int. Cl.⁶ .................................................. H04N 9/31
[52] U.S. Cl. ........................ 348/761; 348/759; 345/53
[58] Field of Search .................... 358/236; 340/784, 340/784 D, 784 C, 784 F, 784 J, 784 I; 307/311, 296.6; 359/72, 84, 85; 345/52, 53, 98, 212; 348/751, 753, 756, 761, 763, 768, 766; H04N 5/74, 9/31

[56] References Cited

U.S. PATENT DOCUMENTS

| | | |
|---|---|---|
| 3,896,318 | 7/1975 | Mitsui . |
| 4,623,222 | 11/1986 | Itoh et al. . |
| 4,920,257 | 4/1990 | Fuerthbauer et al. . |
| 4,941,735 | 7/1990 | Moddel et al. ............ 359/72 |
| 5,057,928 | 10/1991 | Nagashima et al. . |
| 5,089,810 | 2/1992 | Shapiro et al. . |
| 5,122,790 | 6/1992 | Yasuda et al. . |
| 5,142,391 | 8/1992 | Fujiwara et al. . |
| 5,179,692 | 1/1993 | Inoue ....................... 395/500 |
| 5,297,129 | 3/1994 | Wilkinson et al. .......... 369/116 |

FOREIGN PATENT DOCUMENTS

| | | | |
|---|---|---|---|
| 61-294416 | 12/1986 | Japan . | |
| 294416 | 12/1986 | Japan ....................... 359/85 |
| 443778 | 2/1992 | Japan . | |
| 4043778 | 2/1992 | Japan ....................... H04N 5/74 |

*Primary Examiner*—James J. Groody
*Assistant Examiner*—Chris Grant

[57] ABSTRACT

Improved bias drive and noise reduction techniques for use with and image projector, such as a liquid crystal light valve image projector. A bias drive circuit produces a square wave-like signal to drive the liquid crystal light valve, for example, with a square wave signal. The square wave-like signal is phase-locked to the vertical refresh (vertical sync) signal of the projector. A frequency synthesizer is used to drive the bias drive circuit wherein the noise is interlaced by using every other field as the sync reference input to the bias drive circuit. The bias drive circuit is unique in how it reduces unwanted visual noise effects in a displayed image by waveshaping the drive signal and interlacing and phase-locking it to the vertical refresh signal of the projector. These aspects of the present invention combine to virtually eliminate visual noise in the projected image. An optional variable gain circuit may be provided that provides the ability to set the amplitude of the bias provided by the bias drive circuit to the cut-in operating point of the liquid crystal light valve.

13 Claims, 4 Drawing Sheets

BIAS DRIVE AND NOISE REDUCTION IN IMAGE PROJECTORS

BACKGROUND

The present invention relates generally to liquid crystal light valves, and more particularly, to a bias drive circuit and noise reduction technique for use with such liquid crystal light valves.

Previously, liquid crystal light valves have had their bias nodes driven by a sine wave signal source having a frequency of about 2 kHz. A disadvantage of the sine wave signal source is that peak voltage values are approximately double the average absolute values of the voltage. The operation of the liquid crystal light valve depends upon the magnitude of the average value of bias drive voltage, and not the peak or RMS values. The liquid crystal light valves have been driven asynchronously relative to an external video source, which causes a "waterfall" effect of moving horizontal noise lines on a display screen wherein an output image is viewed. It is well known that noise in motion is much more noticeable by a viewer than stationary noise, and this has been a problem with conventional liquid crystal light valve image projectors.

Consequently, it would be an improvement in the art to have an image projector employing a bias drive circuit that does not employ a sine wave drive signal and wherein the projector does not produce moving horizontal noise lines in the projected image.

SUMMARY OF THE INVENTION

The present invention provides for an improved bias drive circuit for use with an image projector. The bias drive circuit produces a square wave-like signal to drive a liquid crystal light valve of the projector, this square wave-like signal is phase-locked to the vertical refresh (vertical sync) signal of the projector, and the noise is interlaced by using every other field as the sync reference input.

More specifically, the present invention provides for apparatus for use in an image projector, and wherein the projector comprises a liquid crystal light valve and a liquid crystal. The apparatus comprises a bias drive circuit including an amplifier having first and second inputs and an output. The first input of the amplifier is adapted to receive a square wave input signal, comprising the vertical sync signal of the projector. A feedback network is coupled between the output and the second input of the amplifier, and is adapted to feed back output signals provided by the bias drive circuit to the amplifier and modify the output signal such that its waveform, when applied to the liquid crystal light valve, results in a square wave applied to the liquid crystal.

The apparatus may also comprise a frequency synthesizer. The frequency synthesizer comprises a divide by two divider having an input adapted to receive an input frequency signal. A phase detector has a first input coupled to an output of the divide by two divider. A filter circuit has an input coupled to an output of the phase detector. A voltage controlled oscillator has an input coupled to an output of the filter circuit. A second divide by two divider has an input coupled to an output of the voltage controlled oscillator. The second divide by two divider provides an output frequency signal from the frequency synthesizer. A divide by N divider is coupled between the output of the second divide by two divider and a second input of the phase detector. An optional variable gain circuit may be provided as part of the image projector that provides the ability to set the amplitude of the bias provided by the bias drive circuit to the cut-in operating point of the liquid crystal light valve.

The present invention thus provides for a circuit that creates an electrical bias waveform that drives the liquid crystal light valve of the image projector. The circuitry is unique in how it reduces unwanted visual noise effects in a displayed image by waveshaping the signal and by interlacing and phase-locking it to the vertical refresh signal of the projector. These aspects of the present invention combine to virtually eliminate visual noise ("hum bars") in the projected image.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
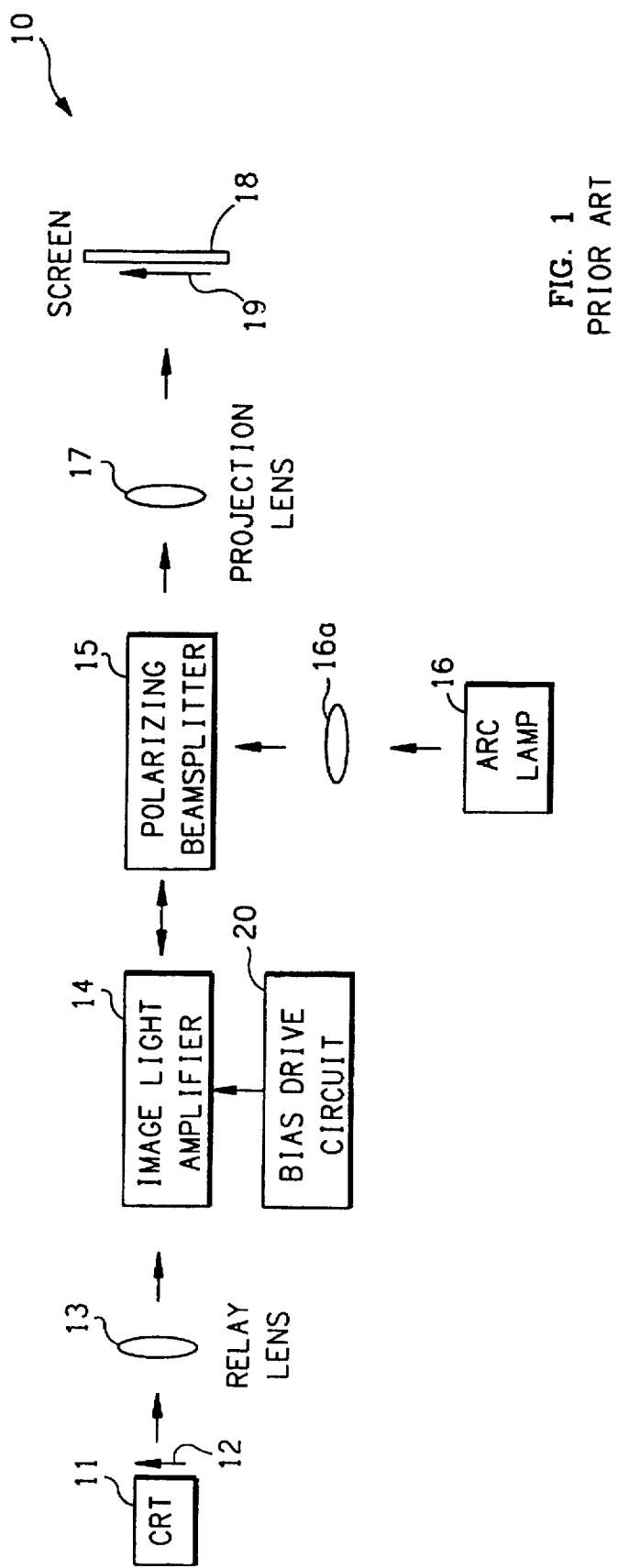
FIG. 1 shows the primary display components of an image projector in which the present invention is employed.

Referring to the drawing figures, FIG. 1 shows the primary display components of an image projector 10 in which a bias drive circuit 20 of the present invention is employed. The projector 10 is comprised of a cathode ray tube (CRT) 11 that provides an image 12 that is to be displayed by the projector 10. A relay lens 13 is adapted to focus the image 12 on an input surface of a liquid crystal light valve 14. The bias drive circuit 20 of the present invention is adapted to drive the liquid crystal light valve 14 to control its output. An arc lamp 16 is focused by a lens 16a onto a polarizing beamsplitter 15 which transfers light from the arc lamp 16 onto an output surface of the liquid crystal light valve 14. This light is reflected from the output surface of the liquid crystal light valve 14 and back through the polarizing beamsplitter 15. The image 12 is "transferred" by the liquid crystal light valve 14 to the light provided by the arc lamp 16. A projection lens 17 then images the reflected light onto an image screen 18 which provides a replication of the image 12 as an image 19 that is viewable by an observer. In general, the design and operation of liquid crystal light valves 14 and projectors 10 are well-known in the art.

Although the present bias drive circuit 20 is described herein with reference to its use with a liquid crystal light valve image projector 10, it is to be understood that the bias drive circuit 20 has general application to image and video projectors employing a variety of image sources and projection technologies. Consequently, this description is not intended to limit the application of the bias drive circuit 20.

Figure 2:
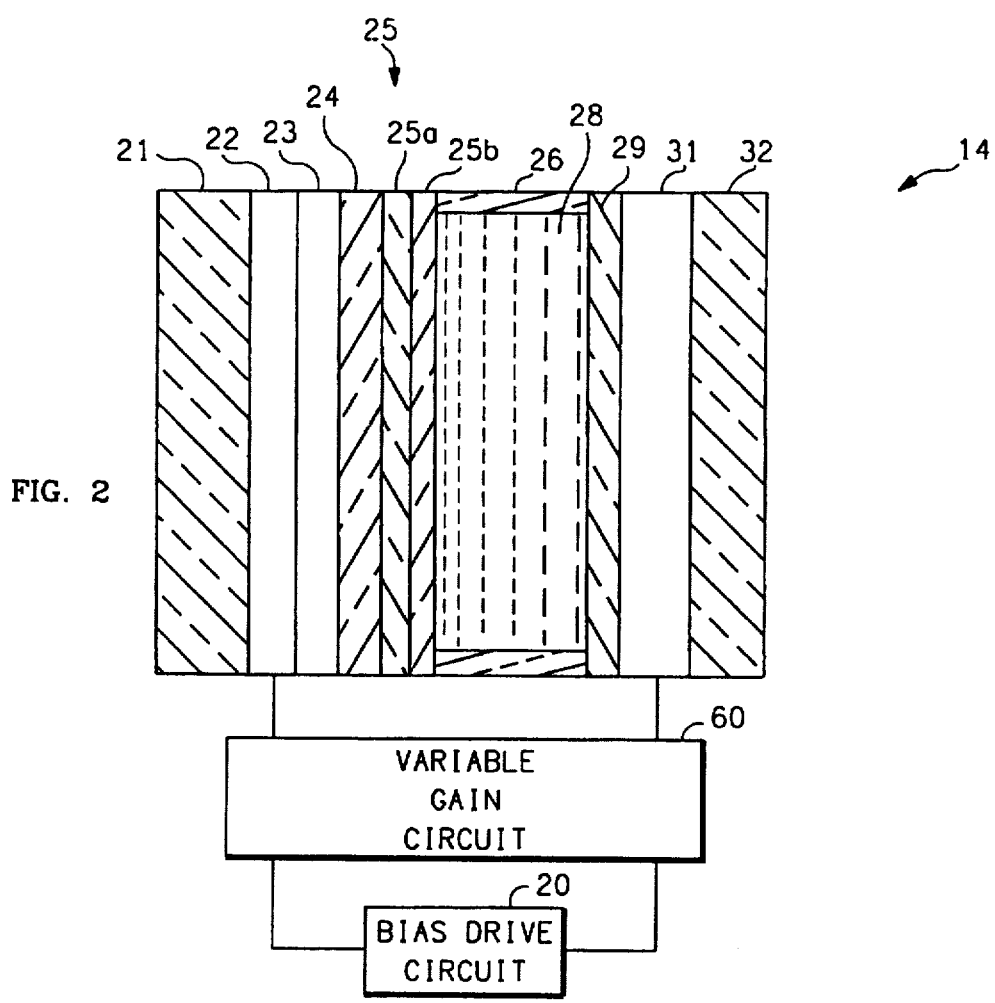
FIG. 2 shows a liquid crystal light valve that is driven by a bias drive circuit in accordance with the principles of the present invention.

FIG. 2 shows the details of construction of the liquid crystal light valve 14 that is driven by the bias drive circuit 20 in accordance with the principles of the present invention. The liquid crystal light valve 14 is a sandwich structure that is comprised of a glass face plate 21 or substrate, a transparent conductive electrode 22, a photosensor 23, a light blocking layer 24, a dielectric mirror 25 comprising material layers 25a, 25b having high and low index of refraction, a nematic liquid crystal 28, a spacer 26, a dielectric insulator 29, a transparent conductive coating 31 and a glass cover 32, typically comprised of quartz. The bias drive circuit 20 is coupled between the transparent conductive electrode 22 and the transparent conductive coating 31. The photosensor 23 may be comprised of amorphous silicon, or other semiconductor material that acts as a photoconductor. The bias drive circuit 20 is adapted to provide drive signals to the conductive elements in a conventional manner that is well-known in the art. The dielectric mirror 25 may be comprised of a plurality of pairs of alternating high and low index of refraction material layers 25a, 25b. For example, in one embodiment of the liquid crystal light valve 14 produced by the assignee of the present invention, 14 pairs of alternating high and low index of refraction material layers 25a, 25b are stacked in order to achieve greater than 99% reflectivity for the dielectric mirror 25.

Figure 3:
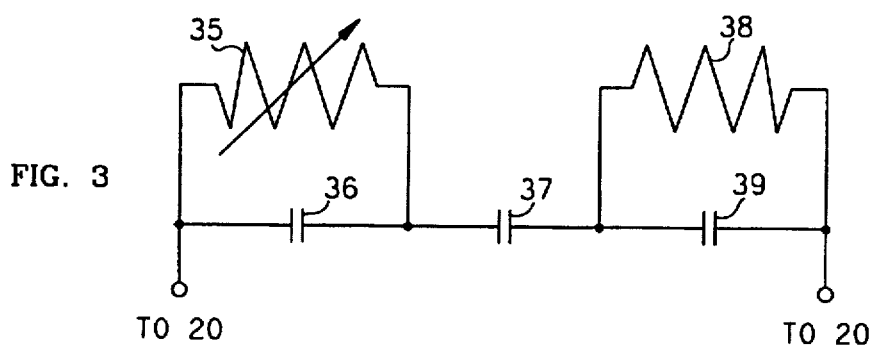
FIG. 3 is an electrical equivalent diagram representing the liquid crystal light valve of FIG. 2.

The liquid crystal light valve 14 functions by "programming" the input surface of the photosensor 23 with light, causing a change in the twist of the liquid crystal 28 which changes the polarization of reflected projection light provided by the arc lamp 16. This is demonstrated a little more clearly by considering an electrical equivalent of the liquid crystal light valve 14. FIG. 3 shows the electrical equivalent diagram representing the liquid crystal light valve 14 of FIG. 2.

Each layer of the liquid crystal light valve 14 forms a parallel plate capacitor. Each layer also has some parallel resistance. The amorphous silicon layer comprising the photosensor 23, has an impedance which is proportional to the incident light (shown as variable resistor 35). The light blocking and mirror layers 24, 25 have very high resistance (not shown) and a high capacitance relative to the other layers (shown as capacitor 37). Finally, the liquid crystal 28 is modelled as a parallel resistance (resistor 36) and capacitance (shown as resistor 38 and capacitor 39), where the capacitance is dependent on the voltage across the liquid crystal 28.

Figure 4:
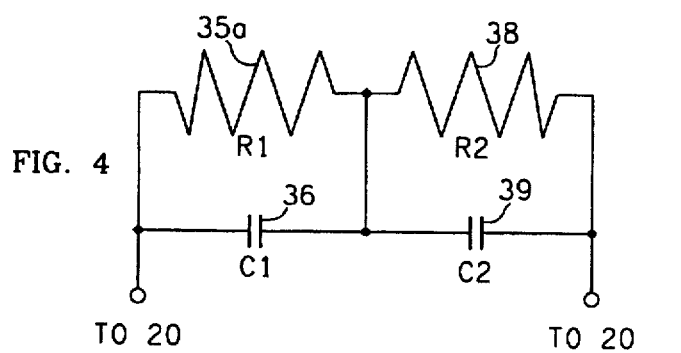
FIG. 4 shows a simplified electrical equivalent diagram derived from FIG. 3.

The contribution to this network by the alternating material layers 25a, 25b comprising dielectric materials of high and low index of refraction is small, so the circuit of FIG. 3 may be simplified, and may be represented by the circuit shown in FIG. 4. In FIG. 4, the resistor 35a (R1) and capacitor 36 (C1) represent the photosensor 23, and the resistor 38 (R2) and capacitor 39 (C2) represent the liquid crystal 28.

Figure 5:
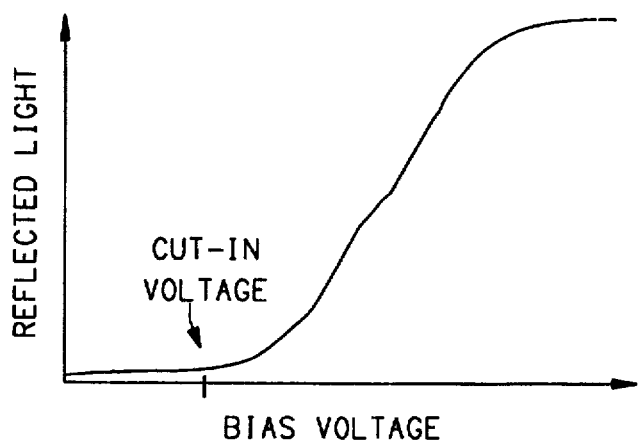
FIG. 5 shows a graph of reflected light versus bias voltage and illustrates the operation of the liquid crystal light valve of FIG. 2.

The liquid crystal 28 acts as a variable mirror by changing the polarization of the incident projected light provided by the arc lamp 16. The amount of polarization is dependent on the twist of the liquid crystal 28 which is dependent on the intensity of an applied electric field. To make this variable mirror function, the amplitude of the electric field is changed. This field is generated by applying a voltage across the electrodes comprising the transparent conductive electrode 22 and the transparent conductive coating 31. The electric field is given in units of volts/meter, and since the thickness of the liquid crystal 28 is constant, the electric field is directly proportional to the voltage. The amount of reflected light provided the liquid crystal light valve 14 is a function of bias voltage as is shown in FIG. 5. The output from the liquid crystal light valve 14 is almost zero until a certain threshold is reached (cut-in voltage) and then the relation between electric field and reflectance is an increasing function of bias voltage as shown in FIG. 5.

Normal operation sets the bias voltage just at the threshold (cut-in voltage). As light is applied to the photosensor 23, the resistance of the photosensor 23 decreases, thereby causing additional voltage to be dropped across the liquid crystal 28 resulting in more reflection. To create a picture, each area on the photoconductor 23 is driven with a different amount of light. However, the bias voltage and waveform apply only at a global level.

The liquid crystal 28 is known to respond to the amplitude of electric field regardless of polarity. Unfortunately, a DC voltage destroys the device over time. Therefore, an AC waveform must be applied. Since polarity is not important, the absolute value of the waveform is what the liquid crystal 28 reacts to. The absolute value of a square wave is a constant DC level, and this is exactly what is required. In conventional projectors, sine wave bias is employed, and the absolute value of a sine wave is a series of hills and valleys. This causes "ripples" of intensity in the amount of reflected light from the liquid crystal light valve 14. The image 19 (picture on a wall or screen 18) then has temporal intensity modulation. This is not good.

Figure 6:
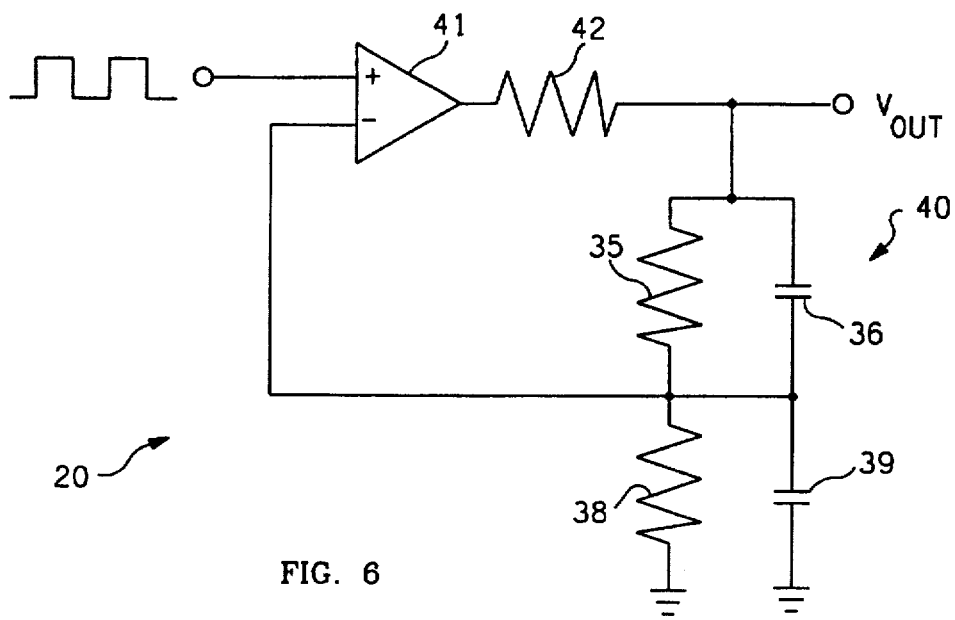
FIG. 6 shows details of the bias drive circuit of the present invention.

Creating a square wave across the liquid crystal 28 is desired and that is what the bias drive circuit 20 of the present invention does. It does this by creating a waveform that, when applied to the bias electrodes (transparent conductive electrode 22 and the transparent conductive coating 31), results in a square wave across the liquid crystal 28. FIG. 6 shows details of the bias drive circuit of the present invention.

Figure 7:
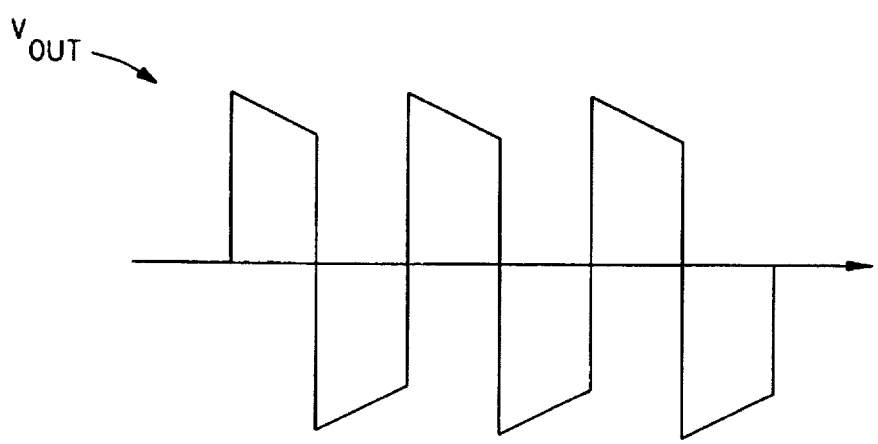
FIG. 7 shows an output signal waveform generated by the bias drive circuit of FIG. 6.

The bias drive circuit 20 uses a feedback network 40 comprising two resistors 35, 38 and two capacitors 36, 39, for example, which represent the electrical equivalent of the liquid crystal light valve 14, as was described with reference to FIG. 4. The bias drive circuit 20 comprises an operational amplifier 41 from which the output voltage is generated. An optional series coupled resistor 42 may be provided to dampen out capacitive loads. This resistor 42 does not otherwise affect the operation of the bias drive circuit 20. By providing a feedback signal from a point between the respective resistor/capacitor pairs (across the liquid crystal 28) to one input of the operational amplifier 41, and driving a second input of the operational amplifier 41 with a square wave input signal, a desired output waveform is created. FIG. 7 shows the output waveform generated by the bias drive circuit 20 of FIG. 6. When this output waveform is applied to the liquid crystal light valve 14 by way of the transparent conductive electrode 22 and the transparent conductive coating 31, the internal electrical field across the liquid crystal 28 is a square wave.

Measurements were taken of an embodiment of the liquid crystal light valve 14 by measuring the impedances of the photosensor 23 and liquid crystal 28. This was done by measuring across a completed device, and also across the a partially completed device comprising the liquid crystal half of the liquid crystal light valve 14. This data was scaled for convenience at 2 kHz and resulted in values for the resistors and capacitors in FIG. 6 as R1=1M; R2=3.3M; C1=1000 pF; and C2=1500 pF. The manner in which these values are derived is not important; it is only necessary that correct resistor and capacitor values be determined that are employed in the bias drive circuit 20.

An attribute of the present bias drive circuit 20 is that the output waveform shown in FIG. 5 is roughly a square wave at 2 kHz. A benefit over a use of conventional sine waves is that the average value (constant electric field that the liquid crystal 28 needs) is slightly less than the peak value. In a sine wave the average value is about 51% of the peak value (absolute value). For reference, the RMS value of a sine wave is 71% of the peak value. The driver requirements for a sine wave need voltage supply rails that are at least double that of the average output. However, in the bias drive circuit of the present invention, the voltage supply need be only slightly greater than the average voltage output level.

A second aspect of the present invention contributes even more to noise reduction in the projector 10. It is well known that moving noise is much more visible to the human eye than stationary noise, especially in the periphery. The present invention also removes moving noise caused by the bias drive circuit 20.

Figure 9:
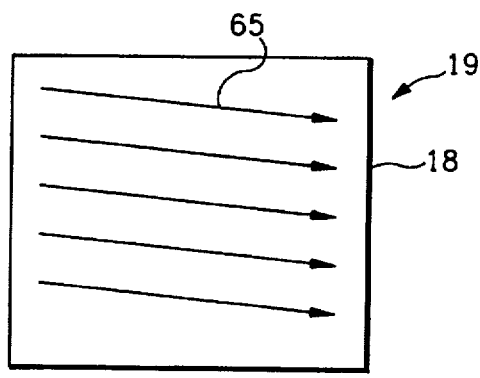
FIGS. 9 and 10 show a comparison of the output of the frequency synthesizer of FIG. 8 illustrating the effects of non-interlaced and interlaced noise lines.
Figure 10:
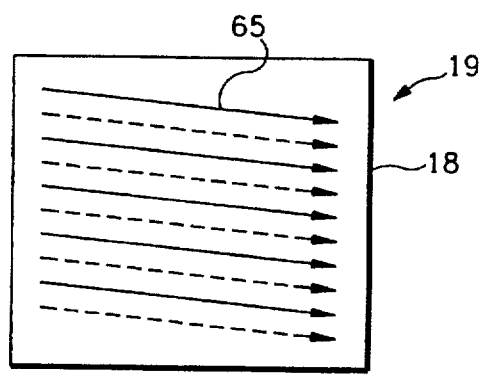

The noise seen in the image 19 resulting from the bias drive waveform is manifested in horizontal lines 65 (shown in FIGS. 9 and 10). These lines 65 create a raster structure. Since the operating frequency of the bias drive circuit 20 is about 2 kHz, this is much higher than the usual 60 Hz vertical refresh frequency. In essence, the noise lines 65 form a raster of about 33 lines (2 kHz divided by 60 Hz). Even with the optimized waveform described above with reference to FIG. 7, there is still some residual noise that can be seen by a viewer.

Figure 8:
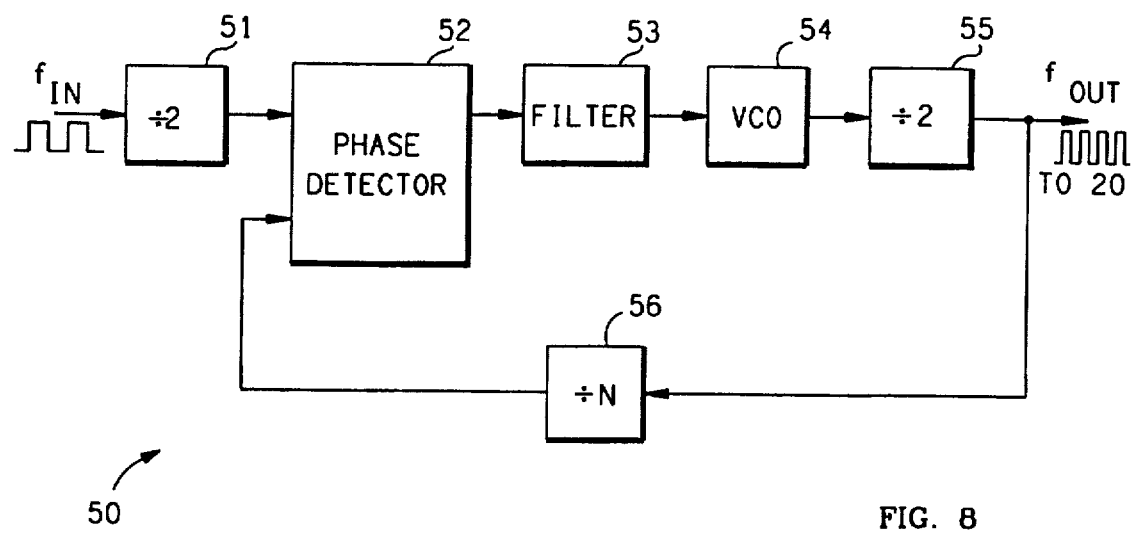
FIG. 8 shows a frequency synthesizer that is employed in conjunction with the bias drive circuit of FIG. 6 that is adapted to eliminate visual noise in image projectors in which it is employed.

The motion of the noise lines 65 is stopped by phase-locking the bias output frequency to the vertical sync input of the projector 10. Since the vertical sync signal is usually on the order of 60 Hz, a frequency synthesizer 50 of the form shown in FIG. 8 is used to create an output frequency close to 2 kHz. Resolution is a function of frequency and operation of the drive circuit is typically in the 1–20 KHz range, and the operating frequency is selected to provide a desired resolution. FIG. 8 shows the details of the frequency synthesizer 50 that is employed in conjunction with the bias drive circuit 20 of FIG. 6 that is adapted to eliminate visual noise produced by the image projector 10.

The frequency synthesizer 50 is comprised of a divide by two frequency divider 51 that is coupled to one input of a phase detector 52. An output of the phase detector 52 is coupled by way of a filter circuit 53, to a voltage controlled oscillator (VCO) 54 and to a second divide by two frequency divider 55 which provides an output frequency ($f_{OUT}$). The output frequency is fed back to a second input of the phase detector 52 by way of a divide by N frequency divider 56. The output of the frequency synthesizer 50 is coupled to the bias drive circuit 20. An optional variable gain circuit 60 may be provided as part of the image projector 10, as is also illustrated in FIG. 2. The variable gain circuit 60 provides the ability to set the amplitude of the bias provided by the bias drive circuit 20 to the cut-in operating point of the liquid crystal light valve 14. The variable gain circuit 60 may be provided by using a potentiometer or a multiplier, for example, as is well-known in the art. The variable gain circuit 60 is coupled between the bias drive circuit 20 and the transparent conductive electrode 22 and transparent conductive coating 31 of the liquid crystal light valve 14.

Elimination of the visible noise lines 65 is accomplished by dividing the output frequency ($f_{OUT}$) by an integer in the divide by N frequency divider 56. This number (N) is programmable and may be controlled by a microprocessor in a conventional manner, for example. The frequency after division by the frequency divider 56 is compared to the reference input signal comprising the vertical sync input signal ($f_{IN}$). Any error in phase or frequency between the two frequency signals is detected by the phase detector 52 which outputs an error signal. This error signal is filtered by the filter circuit 53 and sent to the voltage controlled oscillator (VCO) 54. The feedback loop servos and locks at the correct frequency, and operates as a conventional phase locked loop circuit. The output from the VCO 54 is divided by 2 in the second frequency divider 55 to form a square wave (50% duty cycle). This output is fed to a wave shaping circuit that comprises the bias drive circuit 20, which contours the signal and applies it to the liquid crystal light valve 14.

The action of the phase locked loop provided by the frequency synthesizer 50 greatly reduced the visibility of the noise lines 65 in the image 19. To reduce this even further, the interlace technique is employed. To achieve this, in the frequency divider 56 the present invention the divide number N is an odd number, and the input vertical sync is divided by two so that every other field is the reference input. In addition, this also keeps the output frequency programmable in 60 Hz steps (or the selected vertical rate). However, it is to be understood that the present invention may operate using both odd and even divide numbers N, and as such there is no requirement that the present invention use odd numbers only.

FIGS. 9 and 10 show a comparison of the output of the frequency synthesizer 50 of FIG. 8 illustrating the effects of non-interlaced and interlaced noise lines 65. The present invention uses every other field as the sync input. Therefore, if an even number (N) is used for the frequency divider 56 (see FIG. 9), each field has N/2 noise lines 65 in it. The noise lines 65 for each field fall on top of each other since an even number divided by two is still an integer. However, when an odd number (N) is used in the frequency divider 56 (see FIG. 10), then each field has N/2 lines; but this number is not an integer—it is 0.5 off. What this does is shift the position of the noise lines 65 so that the lines 65 of the second field fall between the lines 65 of the first field. This is the interlace technique employed in the frequency synthesizer 50 of the present invention. For example, if 60 Hz is the vertical refresh rate, then dividing by two yields 30 Hz for the input. If the divide by N frequency divider 56 has "N" set at 67, then the output frequency is 2.01 kHz, and 33.5 lines are painted in each field, but none of the lines overlay each other. The interlace of noise lines 65 creates a slight "flicker" is the picture, but this is outweighed by the benefits in noise reduction.

The present invention is more efficient because it uses reduced power supply voltages. More importantly, the present invention reduces visual noise by optimizing the bias signal wave shape to maintain a more constant electric field intensity across the liquid crystal 28 of the liquid crystal light valve 14. In addition, the present invention reduces visual noise by phase-locking it to the vertical refresh signal, thereby keeping the noise motionless, and much less visible to the viewer. The present invention further reduces visible noise by interlacing the noise, effectively doubling the number of noise lines 65, and thereby cutting the peak to peak noise in half.

The present invention has been built and tested and is employed in an image projector manufactured by the assignee of the present invention. The present invention provides an image that produces less noise than prior liquid crystal light valves used in image projectors.

Thus there has been described a new and improved bias drive circuit and noise reduction technique for use with liquid crystal light valves and projectors. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A bias drive circuit for use in an image projector, said bias drive circuit comprising:

an amplifier having first and second inputs and an output, and wherein the first input of the amplifier is adapted to receive a square wave input signal;

a feedback network means coupled between the output and the second input of the amplifier for feeding back output signals provided by the bias drive circuit to the amplifier and for modifying the output signal therefrom such that its output waveform is a non-square wave that, when applied to the image projector, results in a square wave within the image projector; and a frequency synthesizer comprising:

a divide by two divider having an input adapted to receive an input frequency signal;

a phase detector having a first input coupled to an output of the divide by two divider;

a filter circuit having an input coupled to an output of the phase detector;

a voltage controlled oscillator having an input coupled to an output of the filter circuit;

a second divide by two divider having an input coupled to an output of the voltage controlled oscillator, said second divide by two divider providing an output frequency signal ($f_{OUT}$) from the frequency synthesizer by way of an output, said output frequency signal ($f_{OUT}$) comprising said square wave input signal received by said amplifier first input; and a divide by N divider coupled between the output of the second divide by two divider and a second input of the phase detector.

2. The apparatus of claim 1 wherein the image projector comprises a liquid crystal light valve including a liquid crystal, and wherein the output waveform of the amplifier is applied across the liquid crystal of the liquid crystal light valve.

3. A bias drive circuit for use in an image projector, said bias drive circuit comprising:

an amplifier having first and second inputs and an output, and wherein the first input of the amplifier is adapted to receive a square wave input signal;

a feedback network coupled between the output and the second input of the amplifier that is adapted to feed back output signals provided by the bias drive circuit to the amplifier and modify the output signal therefrom such that its output waveform, when applied to the image projector, results in a square wave applied thereto; and a frequency synthesizer comprising:

a divide by two divider having an input adapted to receive an input frequency signal;

a phase detector having a first input coupled to an output of the divide by two divider;

a filter circuit having an input coupled to an output of the phase detector;

a voltage controlled oscillator having an input coupled to an output of the filter circuit;

a second divide by two divider having an input coupled to an output of the voltage controlled oscillator, said second divide by two divider providing an output frequency signal ($f_{OUT}$) from the frequency synthesizer by way of an output, said output frequency signal ($f_{OUT}$) comprising said square wave input signal received by said amplifier first input; and a divide by N divider coupled between the output of the second divide by two divider and a second input of the phase detector;

wherein a divide number of the divide by N divider is an odd number and the input frequency signal is divided by two so that every other field is employed as a reference input to the bias drive circuit.

4. The apparatus of claim 3 wherein said input frequency signal comprises the vertical sync signal of the image projector.

5. The apparatus of claim 3 further comprising a variable gain circuit that is adapted to set the amplitude of the bias provided by the bias drive circuit to a cut-in operating point of the image projector.

6. A bias drive circuit for use in an image projector comprising a liquid crystal light valve including a liquid crystal, said bias drive circuit comprising:

an amplifier having first and second inputs and an output, and wherein the first input of the amplifier is adapted to receive a square wave input signal;

a feedback network means coupled between the output and the second input of the amplifier for feeding back output signals provided by the bias drive circuit to the amplifier and for modifying the output signal such that its waveform is a non-square wave that, when applied to the liquid crystal light valve, results in a square wave within the liquid crystal; and a frequency synthesizer comprising:

a divide by two divider having an input adapted to receive an input frequency signal;

a phase detector having a first input coupled to an output of the divide by two divider;

a filter circuit having an input coupled to an output of the phase detector;

a voltage controlled oscillator having an input coupled to an output of the filter circuit;

a second divide by two divider having an input coupled to an output of the voltage controlled oscillator, said second divide by two divider providing an output frequency signal ($f_{OUT}$) from the frequency synthesizer by way of an output, said output frequency signal ($f_{OUT}$) comprising said square wave input signal received by said amplifier first input; and a divide by N divider coupled between the output of the second divide by two divider and a second input of the phase detector.

7. A bias drive circuit for use in an image projector comprising a liquid crystal light valve including a liquid crystal, said bias drive circuit comprising:

an amplifier having first and second inputs and an output, and wherein the first input of the amplifier is adapted to receive a square wave input signal;

a feedback network coupled between the output and the second input of the amplifier that is adapted to feed back output signals provided by the bias drive circuit to the amplifier and modify the output signal such that its waveform, when applied to the liquid crystal light valve, results in a square wave applied to the liquid crystal thereof; and a frequency synthesizer comprising:

a divide by two divider having an input adapted to receive an input frequency signal;

a phase detector having a first input coupled to an output of the divide by two divider;

a filter circuit having an input coupled to an output of the phase detector;

a voltage controlled oscillator having an input coupled to an output of the filter circuit;

a second divide by two divider having an input coupled to an output of the voltage controlled oscillator, said second divide by two divider providing an output frequency signal ($f_{OUT}$) from the frequency synthesizer by way of an output, said output frequency signal ($f_{OUT}$) comprising said square wave input signal received by said amplifier first input;

a divide by N divider coupled between the output of the second divide by two divider and a second input of the phase detector; and wherein a divide number of the divide by N divider is an odd number and the input frequency signal is divided by two so that every other field is employed as a reference input to the bias drive circuit.

8. The apparatus of claim 7 wherein said input frequency signal comprises the vertical sync signal of the image projector.

9. A bias drive circuit for use in an image projector comprising a liquid crystal light valve including a liquid crystal, said bias drive circuit comprising:

an amplifier having first and second inputs and an output, and wherein the first input of the amplifier is adapted to receive a square wave input signal;

a feedback network coupled between the output and the second input of the amplifier that is adapted to feed back output signals provided by the bias drive circuit to the amplifier and modify the output signal such that its waveform, when applied to the liquid crystal light valve, results in a square wave applied to the liquid crystal thereof; and a frequency synthesizer comprising:

a divide by two divider having an input adapted to receive an input frequency signal;

a phase detector having a first input coupled to an output of the divide by two divider;

a filter circuit having an input coupled to an output of the phase detector;

a voltage controlled oscillator having an input coupled to an output of the filter circuit;

a second divide by two divider having an input coupled to an output of the voltage controlled oscillator, said second divide by two divider providing an output frequency signal ($f_{OUT}$) from the frequency synthesizer by way of an output, said output frequency signal ($f_{OUT}$) comprising said square wave input signal received by said amplifier first input;

a divide by N divider coupled between the output of the second divide by two divider and a second input of the phase detector; and a variable gain circuit that is adapted to set the amplitude of the bias provided by the bias drive circuit to a cut-in operating point of the liquid crystal light valve.

10. Apparatus for driving a liquid crystal light valve including a liquid crystal, which liquid crystal light valve forms part of an image projector, said apparatus comprising:

a frequency synthesizer comprising:

a divide by two divider having an input adapted to receive an input frequency signal;

a phase detector having a first input coupled to an output of the divide by two divider;

a filter circuit having an input coupled to an output of the phase detector;

a voltage controlled oscillator having an input coupled to an output of the filter circuit;

a second divide by two divider having an input coupled to an output of the voltage controlled oscillator, said second divide by two divider providing an output frequency signal ($f_{OUT}$) from the frequency synthesizer by way of an output;

a divide by N divider coupled between the output of the second divide by two divider and a second input of the phase detector; and a bias drive circuit coupled to the frequency synthesizer that comprises:

an amplifier having first and second inputs and an output;

wherein the first input of the amplifier is adapted to receive a square wave input signal comprising said frequency synthesizer output frequency signal ($f_{OUT}$); and a feedback network means coupled between the output and the second input of the amplifier, for feeding back output signals provided by the bias drive circuit to the amplifier and for modifying the output signal such that its output waveform is a non-square wave that, when applied to the liquid crystal, results in a square wave applied within.

11. The apparatus for driving a liquid crystal light valve including a liquid crystal, which liquid crystal light valve forms part of an image projector, said apparatus comprising:

a frequency synthesizer comprising:

a divide by two divider having an input adapted to receive an input frequency signal;

a phase detector having a first input coupled to an output of the divide by two divider;

a filter circuit having an input coupled to an output of the phase detector;

a voltage controlled oscillator having an input coupled to an output of the filter circuit;

a second divide by two divider having an input coupled to an output of the voltage controlled oscillator, said second divide by two divider providing an output frequency signal ($f_{OUT}$) from the frequency synthesizer by a divide by N divider coupled between the output of the second divide by two divider and a second input of the phase detector;

a bias drive circuit coupled to the frequency synthesizer that comprises:

an amplifier having first and second inputs and an output;

wherein the first input of the amplifier is adapted to receive a square wave input signal comprising said frequency synthesizer output frequency signal ($f_{OUT}$); and a feedback network coupled between the output and the second input of the amplifier, that is adapted to feed back output signals provided by the bias drive circuit to the amplifier and modify the output signal such that its waveform, when applied to the liquid crystal, results in a square wave applied thereto; and wherein a divided number of the divide by N divider is an odd number and the input frequency signal is divided by two so that every other field is employed as a reference input to the bias drive circuit.

12. The apparatus of claim 11 wherein said input frequency signal comprises the vertical sync signal of the image projector.

13. Apparatus for driving a liquid crystal light valve including a liquid crystal, which liquid crystal light valve forms part of an image projector, said apparatus comprising:

a frequency synthesizer comprising:

a divide by two divider having an input adapted to receive an input frequency signal;

a phase detector having a first input coupled to an output of the divide by two divider;

a filter circuit having an input coupled to an output of the phase detector;

a voltage controlled oscillator having an input coupled to an output of the filter circuit;

a second divide by two divider having an input coupled to an output of the voltage controlled oscillator, said second divide by two divider providing an output frequency signal ($f_{OUT}$) from the frequency synthesizer by way of an output;

a divide by N divider coupled between the output of the second divide by two divider and a second input of the phase detector; and a bias drive circuit coupled to the frequency synthesizer that comprises:

an amplifier having first and second inputs and an output;

wherein the first input of the amplifier is adapted to receive a square wave input signal comprising said frequency synthesizer output frequency signal ($f_{OUT}$); and a feedback network coupled between the output and the second input of the amplifier, that is adapted to feed back output signals provided by the bias drive circuit to the amplifier and modify the output signal such that its waveform, when applied to the liquid crystal, results in a square wave applied thereto; and further comprising a variable gain circuit that is adapted to set the amplitude of the bias provided by the bias drive circuit to a cut-in operating point of the liquid crystal light valve.

* * * * *

UNITED STATES PATENT AND TRADEMARK OFFICE
CERTIFICATE OF CORRECTION

PATENT NO. : 5,471,255
DATED : November 28, 1995
INVENTOR(S) : James G. Hagerman It is certified that error appears in the above-indentified patent and that said Letters Patent is hereby corrected as shown below:

| | |
|---|---|
| Abstract, line 2 | please delete "and" and insert therefor --an--. |
| Column 3, line 46 | please delete "," after 23. |
| Column 4, line 67 | please delete "the". |
| Column 5, line 44 | please delete "KHz" and insert therefor --kHz--. |
| Colum 10, line 61 | after the word "by", please insert |
| Claim 11 | --way of an output;--. |

Signed and Sealed this

Twenty-first Day of May, 1996

BRUCE LEHMAN

*Attest:*

*Attesting Officer*   *Commissioner of Patents and Trademarks*

UNITED STATES PATENT AND TRADEMARK OFFICE
CERTIFICATE OF CORRECTION

PATENT NO. : 5,471,255
DATED : Nov. 28, 1995
INVENTOR(S) : James G. Hagerman

It is certified that error appears in the above-indentified patent and that said Letters Patent is hereby corrected as shown below:

Item [73],
Title page, under Assignee: should be --Hughes-JVC Technology Corporation, Carlsbad, California--

Signed and Sealed this

First Day of July, 1997

Attest:

BRUCE LEHMAN

Attesting Officer      Commissioner of Patents and Trademarks